June 26, 1928.

W. G. ORTH ET AL 1,675,046

INDICATING DEVICE FOR AUTOMOBILES AND THE LIKE

Filed Jan. 26, 1924 3 Sheets-Sheet 1

INVENTORS.
WILLIAM G. ORTH.
GEORGE H. DARST.

ATTORNEY.

June 26, 1928.

W. G. ORTH ET AL 1,675,046

INDICATING DEVICE FOR AUTOMOBILES AND THE LIKE

Filed Jan. 26, 1924     3 Sheets-Sheet 2

INVENTORS.
WILLIAM G. ORTH.
GEORGE H. DARST.

ATTORNEY.

June 26, 1928.
W. G. ORTH ET AL
1,675,046
INDICATING DEVICE FOR AUTOMOBILES AND THE LIKE
Filed Jan. 26, 1924 3 Sheets-Sheet 3
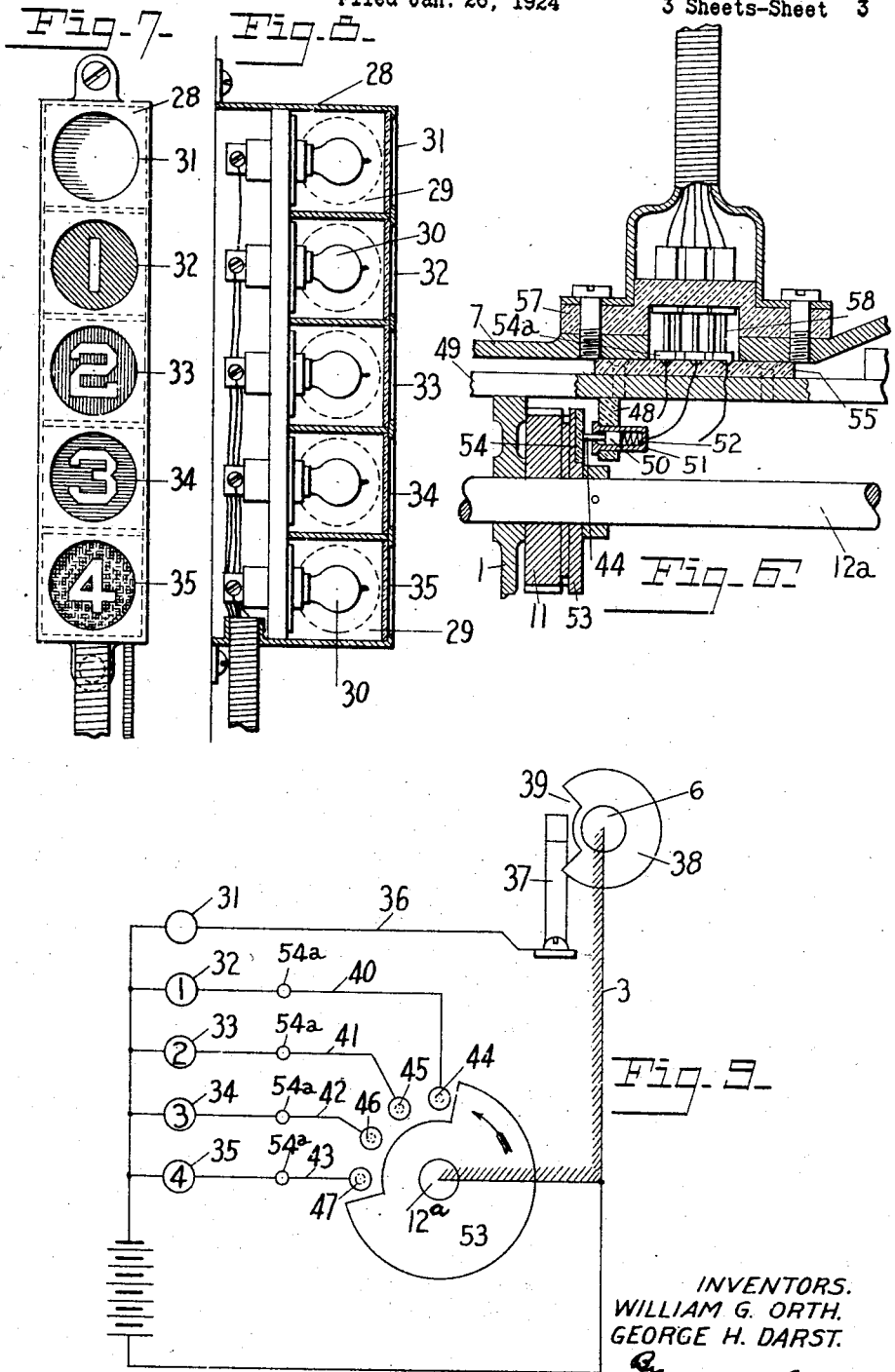

Patented June 26, 1928.

1,675,046

UNITED STATES PATENT OFFICE.

WILLIAM G. ORTH AND GEORGE H. DARST, OF DAYTON, OHIO, ASSIGNORS TO OHMER FARE REGISTER COMPANY, OF DAYTON, OHIO.

INDICATING DEVICE FOR AUTOMOBILES AND THE LIKE.

Application filed January 26, 1924. Serial No. 688,666.

This invention relates to an indicating device for automobiles and the like. In the operation of a taximeter the flag is moved from one position to another to indicate whether or not the cab is for hire and the registering mechanism is so controlled by this flag that it will operate only when the flag is in its lowered or hired position. This flag is not readily visible at night and prospective passengers or inspectors standing on the curb cannot determine with certainty whether or not the flag on the taximeter of an approaching or passing cab is raised or lowered. Further, taximeters are usually provided with registering devices for extras, that is, additional passengers, luggage and the like, which devices are necessarily manually operated by the driver. An inspector or other person outside of the cab has no way of ascertaining whether or not the driver of a cab carrying additional passengers or luggage has registered any or all of these extra charges.

One object of the invention is to provide a device which will operate automatically to indicate to a person outside of the cab the condition of certain parts of the taximeter mechanism.

A further object of the invention is to provide an automatically controlled illuminated signal to indicate the position of the flag.

A further object of the invention is to provide an automatically controlled device to indicate what, if any, manually controlled registrations have been effected on the taximeter.

A further object of the invention is to provide a simple but efficient device for automatically controlling such indications.

A further object of the invention is to provide a circuit controlling device for such an indicator which may be easily applied to a taximeter without modification of the mechanism thereof.

Other objects of the invention will appear as the mechanism is described in detail.

Figure 1:
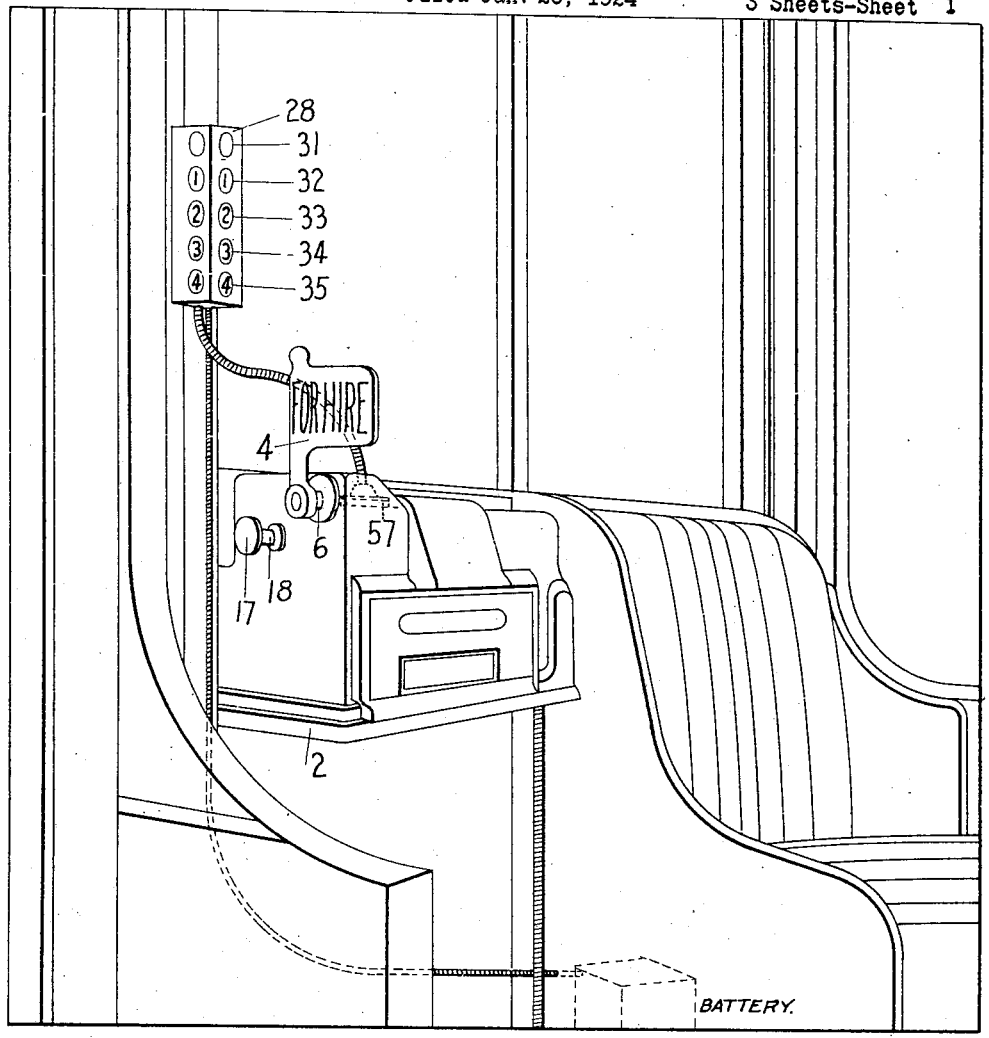
Figure 2:
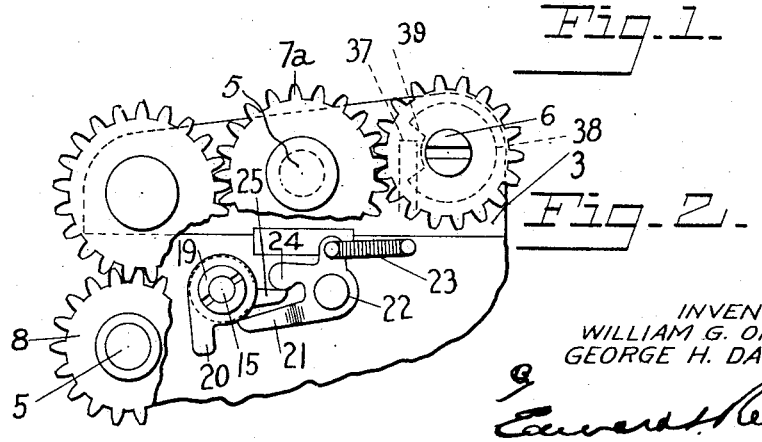
Figure 3:
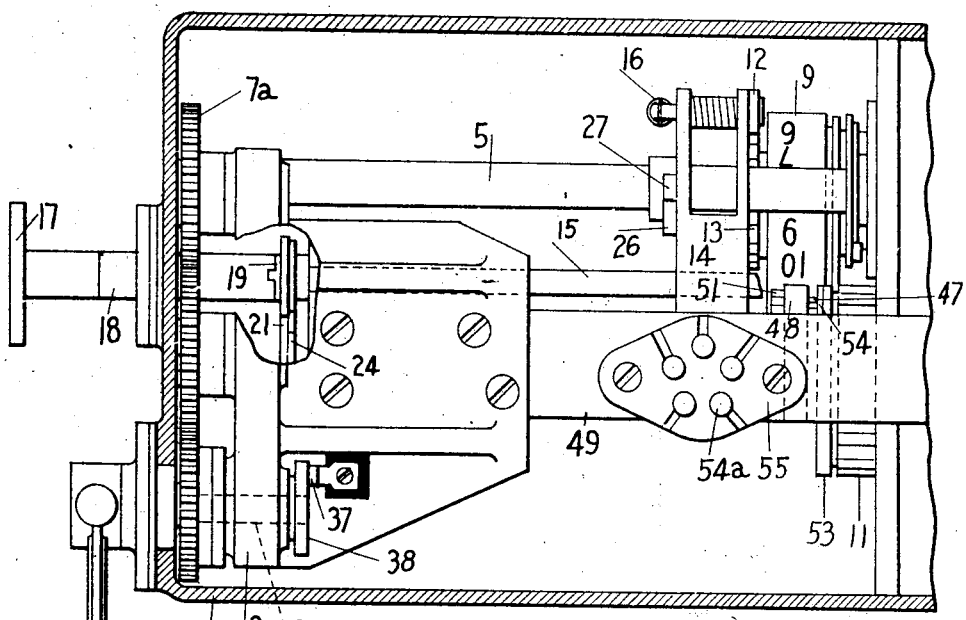
Figure 4:
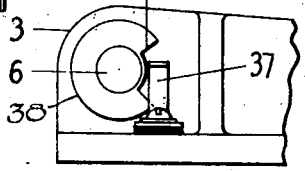
Figure 5:
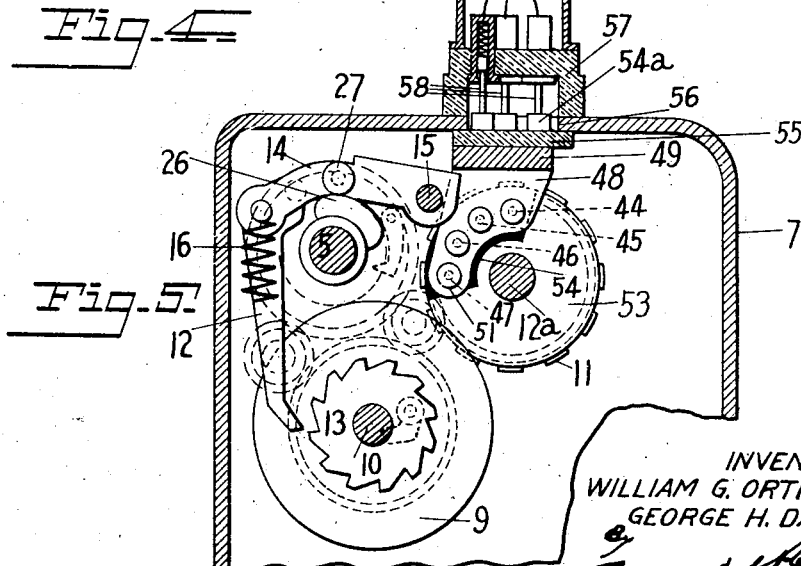

In the accompanying drawings Fig. 1 is a perspective view of the taximeter and indicator showing the same mounted on a taxicab; Fig. 2 is a detail view of the train of gearing actuated by the flag and of the controlling devices for the extras register; Fig. 3 is a plan view of a portion of the taximeter, with its casing in section, showing the application of the controlling devices to the taximeter, and partly broken away; Fig. 4 is a detail view of the flag controlled circuit breaker and closer; Fig. 5 is a sectional view showing in elevation the extras registering device and their associated parts; Fig. 6 is a sectional detail view of the circuit breaker and closer which is controlled by the extras registering device; Fig. 7 is a front elevation of the indicator; Fig. 8 is a longitudinal section taken centrally of the indicator; and Fig. 9 is a diagram of the circuit.

In these drawings we have illustrated one embodiment of our invention and have shown the same as applied to a taximeter of a well known type but it will be understood that this embodiment has been chosen for the purpose of illustration only and that the indicator and its controlling devices may take various forms and may be applied to taximeters of various kinds without departing from the spirit of the invention.

In Fig. 1 we have shown the taximeter 1 as a whole and as mounted upon the bulkhead of a taxicab. In the other views we have illustrated only so much of the taximeter mechanism as is necessary for an understanding of the present invention. The taximeter consists of a main frame comprising a base 2 on which are mounted upright members 3 and this frame carries the registering mechanism and its associated parts. The fare registering devices are not here shown as they are not involved in the present invention but these are operated according to distance and time to compute and register the fare. Their operation is controlled in the usual manner by a flag 4 mounted exteriorly of the casing for movement into a raised position, as shown in Fig. 1, or into a lowered position. When in its raised position the flag indicates that the cab is for hire and in its lowered position it indicates that the cab has been hired. The operation of the registering devices is controlled from the flag through a setting shaft 5 extending lengthwise of the taximeter. In the present machine as a matter of convenience the flag has not been mounted directly upon the flag operated setting shaft 5 but is secured to a stud shaft 6 journaled in the frame member 3 near the front of the taximeter and extending through the end wall of the casing 7 which encloses the taximeter mechanism and which is rigidly secured to the base 2. The stud shaft 6 is connected by a train of gearing 7ª with a gear 8 rigidly secured to the setting shaft 5 so that this shaft is controlled by the movement of the flag.

The extras registering device may take any suitable form and the registering element thereof may be either in the form of a visual indicator or of a recording device. The taximeter here shown is a recording taximeter and therefore the extras registering device thereof embodies both a visual indicator and a recording element. The visual indicator comprises an indicator wheel 9 mounted on a shaft 10 and the recording element comprises a printing or type wheel 11 mounted on a shaft 12ª and having geared connection with the indicator wheel 9 so that the two registering elements will move in unison. The mechanism for taking records from the type wheel is not shown as it is not involved in the present invention. The extras registering device is manually operated and, in the present instance, the registering wheels are advanced step by step by means of a pawl 12 which engages a ratchet wheel 13 connected with one of the registering elements, in the present instance, the indicator wheel 9. This pawl is pivotally mounted at the free end of a lever 14 which is rigidly secured to a shaft 15. A spring 16 acts on the lever 14 to move the same and the pawl downward and a manually operated device serves to elevate the arm and the pawl and then release the same for movement by the spring so that the pawl will engage the ratchet wheel 13 and advance the extras register one step, that is, a distance corresponding to one registration. The operating device comprises a handle or knob 17 having a shaft 18 which extends through the end wall of the casing 7 and is connected at its inner end with a hub 19 rotatably mounted on the end of the shaft 15 and having a cam projection 20 (Fig. 2) which is so arranged that when the hub 19 is rotated the projection will engage one arm 21 of a two arm lever which is pivotally mounted on a shaft 22 and held in its normal position by a spring 23. The second arm 24 of this two arm lever is arranged to engage a finger 25 rigidly secured to the shaft 15, the arrangement being such that when the arm 21 is actuated by the cam projection 20 as the same is rotated clockwise as viewed in Fig. 2 the arm 24 will actuate the finger 25 and rotate the shaft 15 a distance sufficient to elevate the lever 14 and pawl 12 and the continued rotation of the cam will move the same clear of the arm 21, thus releasing the parts and permitting the pawl to be moved downwardly by the spring 16. The extras registering device is controlled by the flag so that it will be operable only when the flag is in its lowered position. To this end we have mounted on the flag controlled shaft 5 a cam 26 (Fig. 5) arranged to engage a projection 27 on the lever 14 and support that lever and the pawl 12 in an inoperative position, when the flag is in its raised position. When the flag is lowered the cam is moved out of engagement with this projection 27 and the lever and pawl are released. However, the cam does not elevate the pawl far enough to enable it to engage the next tooth on the ratchet wheel 13 and consequently the movement of the pawl, on the lowering of the flag, will not advance the registering devices. The several parts of the taximeter mechanism above described are parts of the well known taximeter shown and form no part of the present invention except in so far as they enter into combination with the indicating devices.

The indicator for designating the position of the flag and the condition of the extras registering device may take any suitable form and the designations thereon may be exposed to view in various ways but we prefer to utilize an illuminated indicator in which each designation is separately controlled. In the present instance, the indicator is mounted independently of the taximeter and at a point somewhat remote therefrom but in which it will be readily visible to a person in front of or at the side of a cab. As here shown, the indicator as a whole comprises a vertically arranged elongated casing 28 adapted to be rigidly secured to a supporting structure, such as the body of the taxicab. This casing is divided into a plurality of compartments 29 (Fig. 8) in each of which is mounted an electric lamp 30. Each compartment is provided with an opening, preferably closed by transparent or translucent material, such as glass, so that it will be illuminated when the lamp within the compartment is lighted. Preferably each compartment is provided with three such openings, one facing forward and the other two facing laterally, so that the indications will be readable by a person in front of or at either side of the cab. The opening 31 of the uppermost compartment is, in the present instance, closed by plain white glass, the illumination of which designates the lowered position of the flag. The openings 32, 33, 34 and 35, of the lower compartments of the indicator are also closed by glass or other similar material which is of such a character or so marked that the illumination of the respective compartments will designate different registrations on the extras registering device. As here shown the closures for these openings are marked, respectively, with the numerals 1, 2, 3 and 4, to indicate corresponding registrations. We also prefer that these openings should be closed by colored glass, each closure being of a different color, in the present instance, green, red, blue and yellow, respectively. The illumination of any one of these designations indicates the corresponding registration on the registering devices and by using colors as well as numerals the inspector is enabled to determine the number of registrations by the color of the indication when he might not be able to read the figures thereon. The several lamps 30, which control the exposure to view of the respective designations of the indicator, are connected in separate circuits and are independently controlled.

The circuit 36 (Fig. 9) of the designation 31 is connected on one side with a stationary contact member 37 and is connected on the other side, preferably by grounding the same on the frame of the machine, with the shaft 6 on which the flag is mounted. Rigidly secured to the shaft 6 and in electrical contact therewith is a contact member 38 adapted to be moved by the rotation of the shaft into and out of engagement with the contact member 37 and to thereby control the circuit through the flag designation. In the present instance, the contact member 38 is in the form of a disk having a portion of its periphery cut away, as shown at 39, this cut away portion being so arranged that when the flag is in its raised position the disk will not engage the contact member 37 and when the flag is lowered the disk will engage the contact member 37 and will remain in contact therewith until the flag is returned to its raised position.

The extras indicating designations, 32, 33, 34 and 35, of the indicator are connected respectively by circuits 40, 41, 42 and 43, with contacts 44, 45, 46 and 47, which contacts are adapted to be engaged by a contact member associated with the extras registering device and so arranged that the position thereof will cause to be illuminated the designation or designations corresponding to the extras which have been registered. This circuit breaker and closer, which is controlled by the extras registering devices, may take various forms and may be connected with the registering device in various ways but, in the present instance, the several contact members 44, 45, 46 and 47, are mounted in a plate 48 (Figs. 5 and 6) of insulating material which is rigidly secured to a bar 49 extending lengthwise of the taximeter and this plate extends downwardly from the bar in a substantially vertical plane, the respective contact devices being arranged in spaced alinement on the plate. Preferably the contact members are yieldable and, in the form here shown, each is carried by a plunger 50 slidably mounted in a casing 51 mounted in the plate 48 and is acted upon by a spring 52 which tends to press the same outwardly. In the present arrangement of the circuit breaker and closer the plate 48 is arranged adjacent to the printing type wheel 11 and associated with this wheel is a second contact member which, if desired, may consist of a disk 53 rigidly connected with the type wheel and overlapping the plate 48 and the contact members carried thereby. This disk is provided, in that face thereof adjacent to the contact members, with a section of insulating material 54 of such size and so arranged that when the type wheel is in its zero position, that is, when no registration has been effected thereon, the insulated section 54 will be in engagement with all the contact members on the plate 48 and consequently the several circuits will be broken and the indicator will show that no extras have been registered. When the registering element or type wheel 11, has been advanced one point the metallic surface of the disk 53 will be brought into engagement with the first contact member 44, thus closing the circuit through the first extras designation, 32, and indicating that one extra has been registered. Further step by step movement of the registering element will cause the contact member 53 to successively engage the several contacts 45, 46 and 47, thereby closing the circuits through the successive designations of the indicator. The present arrangement is such that the several circuits remain closed and all designations which have been illuminated remain illuminated until the registering element is restored to its zero position. This, however, is not essential as each of the extras designations of the indicator indicates in itself the number of registrations which have been effected. The contact member 53 may be connected with the circuits of the indicator in any suitable manner but this is preferably accomplished by grounding the circuit through the frame of the machine and the shaft 12ª on which the contact member is mounted. The several contact members carried by the plate 48 are electrically connected with a series of terminals 54ª carried by a plate 55 supported on the bar 49. The casing 7 has an opening 56 (Fig. 5) arranged above the plate 55 into which the terminals 54ª may extend. Rigidly secured to the casing and surrounding the opening 56 therein is a cap or housing 57 having mounted therein a series of contact members 58 connected with the respective circuits leading to the indicator and arranged, when the casing 7 is in position on the taximeter, to engage the respective terminals 54ª on the plate 55, thereby establishing electrical connection between the illuminating devices and the circuit breaker and closer. Inasmuch as this cap or housing 57 is rigidly secured to the casing and the casing is rigidly secured to the frame of the machine it will be obvious that these circuits cannot be tampered with.

It will be apparent that while the extras indicating devices are selectively controlled by the extras registering device they are also controlled by the flag so that no extras indication can appear on the indicator until the flag has been lowered. This is due to the fact that the operating pawl 12 for the extras register is inoperative until the flag has been lowered and consequently the circuit breaker and closer which is associated with the extra registering device cannot be actuated until the flag is lowered.

While we have shown and described one embodiment of our invention we wish it to be understood that we do not desire to be limited to the details thereof as various modifications may appear to a person skilled in the art.

Having now fully described our invention, what we claim as new and desire to secure by Letters Patent, is:

1. The combination with a taximeter comprising a rotatable registering element and means for actuating the same, of an indicator having a plurality of designations corresponding to items to be registered on said registering devices, electric lamps to illuminate the respective designations of said indicator, a circuit for each lamp, a plurality of contact members mounted adjacent to said registering element and connected with the respective circuits, a contact member comprising a disk connected with said registering element for rotation therewith and having a section of its surface insulated, said insulated section being of such size and so arranged that when said registering element is in its initial position said insulated section will engage all of said contacts and the rotation of said registering element will cause the contact surface of said disk to successively engage said contacts.

2. The combination with a taximeter comprising a main frame, a registering element rotatably mounted on said main frame and means for actuating said registering element, of an indicator having a plurality of designations corresponding to items to be registered on said registering device, electric lamps to illuminate said designations, a circuit for each lamp, a plate rigidly secured to said main frame and extending alongside of said registering element, a plurality of contacts carried by said plate and connected with the respective circuits, a contact member connected with said registering element and so arranged that when said registering element is in its initial position the contact surface of said member will be out of engagement with all of said contacts and when operative movement is imparted to said registering element said contact surface will successively engage said contacts.

3. The combination with a taximeter comprising a main frame, a registering element rotatably mounted on said main frame and means for actuating said registering element, of an indicator having a plurality of designations corresponding to items to be registered on said registering device, electric lamps to illuminate said designations, a circuit for each lamp, a plate rigidly secured to said main frame and extending alongside of said registering element, a plurality of contacts carried by said plate and connected with the respective circuits, a contact member comprising a disk rigidly connected with said registering element adjacent to one face thereof, said disk having one face arranged adjacent to said contact member and provided with an insulated section normally in engagement with said contacts, the contact surface of said disk being arranged to successively engage said contact members when operative movement is imparted to said registering element.

4. The combination with a taximeter comprising a main frame, a registering device mounted on said main frame, means for actuating said registering device and a casing enclosing said main frame and the parts carried thereby, of an indicator having a plurality of indications corresponding to items to be registered on said registering device, electric lamps for illuminating said designations, a circuit for each lamp, a plate rigidly secured to said main frame and arranged adjacent to said registering device, a plurality of contacts carried by said plate, other contacts mounted on said main frame and connected with the respective first mentioned contacts, said casing having an opening in line with the last mentioned contacts, a housing carried by said casing to close said opening, a series of contacts mounted in said housing, connected with the respective circuits and arranged to engage the second mentioned contacts when said casing is in position on said main frame, and a contact member connected with said registering device and movable successively into engagement with the first mentioned contacts.

5. The combination with a taximeter comprising a main frame, a registering device mounted on said main frame, means for actuating said registering device, and a casing enclosing said main frame and the parts carried thereby, of an indicator having a plurality of indications corresponding to items to be registered on said registering device, electrically controlled means for exposing to view a selected designation of said indicator, a plurality of circuits for said electrically controlled means, separate contacts carried by said main frame, a second series of contacts carried by said main frame, and electrically connected with the first mentioned contacts, said casing having an opening in line with said second series of contacts, a housing secured to said casing and enclosing said second series of contacts, and another series of contacts mounted within said housing, connected with the respective circuits and arranged to engage the respective contacts of the second series when said casing is in position on said frame, a contact member operatively connected with said registering device and arranged to engage one of the first mentioned contacts when operative movement is imparted to said registering device.

6. The combination with a taximeter comprising a registering device, means for actuating the same and a flag movable from one position to another, of an indicator having a plurality of designations corresponding to items to be registered on said registering device, separate electrically controlled means for exposing to view the respective designations on said indicator, and means associated with said registering device to selectively control said means for exposing to view the designations on said indicator, and means actuated by said flag to control the operation of said registering device.

7. The combination with a taximeter comprising a registering device, means for actuating the same, and a flag movable from one position to another, of an indicator having a plurality of designations corresponding to items to be registered on said registering device, separate electrically controlled means for exposing to view the respective designations on said indicator, and means mounted independently of said flag and controlled by said flag to control the operation of the last mentioned means.

8. The combination with a taximeter comprising a registering device, means to actuate the same, and a flag movable from one position to another, of an indicator having a plurality of designations, separate electrically controlled means for illuminating the respective designations, a separate circuit for each of said illuminating means, means controlled by the operation of said flag to close the circuit through the illuminating device for one of said designations, and other means controlled by said registering device to selectively close the circuits through the illuminating devices for other of said designations.

9. The combination with a taximeter comprising a registering device, means to actuate the same, and a flag movable from one position to another, of an indicator having a plurality of designations, separate electrically controlled means for illuminating the respective designations, a separate circuit for each of said illuminating means, a circuit breaker and closer for one of said circuits, said circuit breaker and closer being controlled by said flag, a series of contacts connected respectively with others of said circuits, and a contact member connected with said registering device for movement therewith and arranged to successively engage said contacts.

10. The combination with a taximeter comprising a registering device, means to actuate the same, and a flag movable from one position to another, of an indicator comprising a plurality of compartments each having a sight opening, closures for said openings having individual designations, an electric lamp mounted in each compartment to illuminate said designation, a separate circuit for each lamp, means actuated by said flag for controlling one of said circuits, and means actuated in unison with said registering device for controlling a plurality of said circuits.

11. The combination with a taximeter comprising a registering device, means to actuate the same, and a flag movable from one position to another, of an indicator comprising a plurality of compartments each having a sight opening, translucent closures for said openings, each of a different color, a part of said translucent closures having thereon designated marks, an electric lamp in each of said compartments, a circuit for each lamp, means controlled by said flag for closing one of said circuits, and means controlled by said registering device for selectively closing a plurality of said circuits.

12. The combination with a taximeter comprising a registering device having a rotatable registering member, and means to actuate the same, of an indicator having a plurality of designations corresponding to items to be registered on said registering device, separate electric lamps to illuminate the respective designations of said indicator, a circuit for each lamp, a plurality of contacts connected with the respective circuits, and a contact member mounted for rotation about the axis of said registering member, operatively connected therewith and having a part to be moved successively into engagement with the several contacts.

13. The combination with a taximeter comprising a registering device having a rotatable registering member, and means to actuate the same, of an indicator having a plurality of designations corresponding to items to be registered on said registering device, separate electric lamps to illuminate the respective designations of said indicator, a circuit for each lamp, a plurality of contacts connected with the respective circuits, and a contact member mounted for rotation about the axis of said registering member, operatively connected therewith and having its contact surface so arranged that when said registering element is in its initial position said contact surface will be out of engagement with all of said contacts and when operative movement is imparted to said registering device said contact surfaces will successively engage the several contacts.

14. The combination with a taximeter comprising a main frame, a registering device mounted on said main frame, means for actuating said registering device, and a casing enclosing said main frame and the parts carried thereby, of an indicator having a plurality of indications corresponding to items to be registered on said registering device, electric lamps for illuminating said designations, a circuit for each lamp, a series of fixed contacts connected with the respective circuits, a second series of contacts supported by said main frame and connected respectively with the contacts of the first mentioned series, a third series of contacts carried by said casing, connected with the respective circuits and arranged to engage the corresponding contacts of said second series when said casing is in position on said main frame, and a contact member connected with said registering device and movable successively into engagement with the contacts of the first mentioned series.

In testimony whereof, we affix our signatures hereto.

WILLIAM G. ORTH.
GEORGE H. DARST.